United States Patent [19]

Wilk et al.

[11] Patent Number: 4,474,940
[45] Date of Patent: Oct. 2, 1984

[54] ALKYD RESINS FROM OPENED EPOXIDIZED HYDROXYL COMPOUNDS

[75] Inventors: Hans-Christoph Wilk, Neuss; Alfred Meffert, Monheim; Herbert Fischer, Duesseldorf; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 561,622

[22] Filed: Dec. 15, 1983

[30] Foreign Application Priority Data

Dec. 16, 1982 [DE] Fed. Rep. of Germany ....... 3246618
Jul. 22, 1983 [EP] European Pat. Off. ........ 83107187.3

[51] Int. Cl.$^3$ .............................................. C08G 63/54
[52] U.S. Cl. .................................. 528/295.3; 524/601; 524/539; 528/288; 528/289; 528/295.5; 528/296; 528/297
[58] Field of Search ..................... 528/288, 289, 295.3, 528/295.5, 296, 297

[56] References Cited

U.S. PATENT DOCUMENTS

| | | | |
|---|---|---|---|
| 4,031,047 | 6/1977 | Dhein et al. | 528/295.5 X |
| 4,039,495 | 8/1977 | Humsucker | 260/22 |
| 4,042,547 | 8/1977 | Kaiser et al. | 528/295.5 |
| 4,049,599 | 9/1977 | Lott | 528/295.3 X |
| 4,179,420 | 12/1979 | Laganis | 528/296 X |
| 4,200,560 | 4/1980 | Kubo et al. | 528/297 X |
| 4,220,568 | 9/1980 | Patzschke | 528/295.3 |
| 4,248,745 | 2/1981 | Laganis | 528/296 X |
| 4,271,051 | 6/1981 | Eschwey | 260/22 |
| 4,333,865 | 6/1982 | Zückert | 528/297 X |
| 4,390,688 | 6/1983 | Walz et al. | 528/296 X |

*Primary Examiner*—Lucille M. Phynes
*Attorney, Agent, or Firm*—Ernest G. Szoke; Henry E. Millson, Jr.; Mark A. Greenfield

[57] ABSTRACT

Alkyd resins useful in forming stoving lacquers, containing the reaction product of a polybasic carboxylic acid or reactive derivative thereof and a polyhydric alcohol which is itself the reaction product of an epoxidized fatty acid ester, fatty acid amide or fatty alcohol and an alcohol or phenol, and, optionally, a monofunctional modifying agent.

17 Claims, No Drawings

ALKYD RESINS FROM OPENED EPOXIDIZED HYDROXYL COMPOUNDS

BACKGROUND OF THE INVENTION

This invention relates to novel alkyd resins which contain polyfunctional hydroxyl compounds produced from epoxides of fatty acid derivatives or from epoxides of fatty alcohols. More particularly, the invention relates to improved alkyd resins for use in water lacquers, particularly stoving water lacquers.

Alkyd resins are polyesters of oils or fatty acids, polyfunctional carboxylic acids and polyfunctional hydroxy compounds. Although numerous compounds may be used for the production of alkyd resins, for economic reasons, the number of compounds actually used is very limited. In order therefore to satisfy increased technical requirements in special fields, there is a need for new resins based on new commercially obtainable starting materials. This is particularly applicable to the alkyd resins used in stoving water lacquers. Due to the shortage and high cost of petrochemical raw materials, natural oleochemical products are attracting particular interest.

In recent years, numerous efforts have been made to provide stoving lacquers which, on stoving, give off hardly any volatile atmosphere-polluting substances. For example, it has frequently been proposed to use as binders carboxyl group-containing alkyd resins which can be dissolved in aqueous solvent mixtures after neutralization with amines. Alkyd resins suitable for this purpose generally have acid numbers of from 40 to 80 mg of KOH/g. The use of alkyd resin dispersions which have acid numbers of from <30 mg of KOH/g or even <10 KOH/g, but which contain emulsifiers, is also known.

Finally, alkyd resin microemulsions are known which have acid numbers of from 5 to 35, but which contain no volatile solvents and only emulsifiers of the type which lose their hydrophilicity on stoving. Thus, U.S. Pat. No. 4,271,051 describes alkyd resins containing numerous 2,3-dihydroxy propyl groups through the reaction of free carboxyl groups with glycidol. By selecting suitable amines, emulsifiers and crosslinking agents (generally melamine resins), it is possible to produce from these alkyd resins optically clear aqueous preparations (microemulsions) which on stoving give off hardly any harmful constituents to the atmosphere.

Although these alkyd resins are largely satisfactory both in terms of processibility into water lacquers and in terms of environmental considerations, there is still a need to improve the technical properties of lacquer films obtainable therefrom. Thus, the resistance to water (as determined by the "sweatbox" test) and also the flexibility of the lacquer films, despite their considerable hardness, are in need of improvement without however producing any adverse effects upon their other favorable technical properties.

It is known from U.S. Pat. No. 4,039,495 that trimethylol nitromethane may be used as an additive for increasing the flexibility of alkyd resin lacquers. Unfortunately, this highly hydrophilic additive reduces the resistance of the lacquer films to water very considerably. Attempts to obtain flexible lacquers by increasing the fatty acid content of the alkyd resins were also unsuccessful because resins of this type could not be made up into water lacquers without the use of solvents.

DESCRIPTION OF THE INVENTION

Accordingly, one object of the present invention is to provide new alkyd resins which show advantageous properties and which contain as hydroxy compounds reaction products of epoxidized fatty acid derivatives or fatty alcohols. Another object of the invention is to provide improved alkyd resins which can be processed into water lacquers having increased flexibility despite their extreme hardness, and by increased resistance to condensed moisture. Finally, an object of the present invention is to improve the alkyd resins of U.S. Pat. No. 4,271,051, to provide alkyd resins which can be made up into environmentally safe lacquer systems, having flexibility despite extreme hardness, and having good resistance to condensed moisture.

According to the invention, the objects stated above are achieved by replacing at least some of the hydroxy compounds normally used in alkyd resins by the reaction products of epoxidized fatty acid derivatives or epoxidized fatty alcohols, wherein these starting materials are produced in a preceding, separate step.

Accordingly, the present invention relates to alkyd resins produced from polybasic carboxylic acids or their reactive derivatives and polyhydric alcohols, optionally using monofunctional modifying agents, wherein the polyhydric alcohols present, at least in part, i.e. from about 25% to 100% by weight of the polyhydric alcohols, are at least one reaction product of an epoxidized fatty acid ester of a monohydric, dihydric, or polyhydric alcohol, e.g. an epoxidized triglyceride, or an epoxidized fatty acid amide, or an epoxidized fatty alcohol, with an alcohol or a phenol which alcohol or phenol has optionally been reacted, at least partly, with an alkene oxide containing up to 4 carbon atoms. When the polyhydric alcohols present in the alkyd resins of the invention are not all the reaction products specified above, i.e. are partly polyhydric alcohols normally used to produce alkyd resins, such polyhydric alcohols are those commonly used in the preparation of alkyd resins, preferably low molecular weight trifunctional alcohols containing from 3 to 6 carbon atoms, such as for example glycerol, trimethylol ethane, or trimethylol propane, or low molecular weight tetrafunctional alcohols, such as pentaerythritol or di-(trimethylolpropane). The fatty acid and fatty alcohol portions of the above epoxidized components contain from 12 to 22 carbon atoms, preferably from 16 to 22 carbon atoms.

The alcohol or phenol with which the epoxidized fatty acid ester, epoxidized fatty acid amide, or epoxidized fatty alcohol is reacted include primary monofunctional straight-chain or branched chain aliphatic alcohols, preferably containing up to 8 carbon atoms; dihydric alcohols, such as glycols, containing up to 6 carbon atoms, e.g. ethylene glycol, propylene glycol, butane diol, neopentyl glycol, hexane diol, etc.; polyhydric alcohols such as glycerol, trimethylol propane, and pentaerythritol; polyhydric and/or polynuclear phenols such as hydroquinone, resorcinol, and bisphenol A; and the reaction products of any of the above with from 1 to 30 moles of ethylene oxide, propylene oxide or glycidol per mole of alcohol or phenol.

The reaction between the epoxidized fatty acid ester, epoxidized fatty acid amide, or epoxidized fatty alcohol and the alcohol or phenol is carried out as follows: For acid-catalyzed ring opening, it is preferred initially to introduce the alcohol or phenol and catalytic quantities of an acid, for example sulfuric acid, phosphoric acid, 4-toluene sulfonic acid or acid ion exchangers, into the reaction vessel and then to add the epoxidized fatty acid derivative or epoxidized fatty alcohol in portions at temperatures in the range of from about 50° to about 130° C. and preferably at temperatures in the range of from about 70° to about 100° C.

The course of the reaction may be followed by gas chromatography or by titration of the residual epoxide oxygen. The epoxidized component is quantitatively reacted after reaction times of from about 2 to about 6 hours and preferably of from about 3 to about 5 hours, depending on the size of the batch and the addition rate. At the end of the reaction, the acid catalyst can be neutralized by suitable bases. Readily volatile constituents, such as for example unreacted hydroxy compounds, can be distilled off in vacuo.

Acid catalysis is preferred for use in the above process wherein the epoxidized component is reacted with polyfunctional aliphatic alcohols. Other variants of the process can also be used for carrying out the acid-catalyzed ring-opening reaction. Thus, all the starting materials can be simultaneously introduced into the reaction vessel or, alternatively, either the hydroxy component or the epoxidized component can be added incrementally.

The ring opening of the epoxidized component with phenols is preferably base-catalyzed. Suitable bases are, for example, alcoholates or phenolates of alkali metals or tertiary amines. The base-catalyzed reaction is carried out at temperatures in the range of from about 100° to about 180° C. and preferably at temperatures in the range of from about 120° to about 160° C. In this instance, it is preferred to introduce all the reaction components into the reaction vessel at the same time, although it is possible here also to initially introduce separately either the phenols or the epoxidized component to the reaction vessel. In general, the base-catalyzed reaction takes somewhat longer than the acid-catalyzed reaction. Thus, complete conversion is obtained, for example, after 4 to 8 hours. On completion of the reaction, the catalysts can be destroyed by the addition of an acid. It is then advisable to wash the reaction products free from salts and/or to distill off volatile constituents in vacuo.

In the above reaction between the epoxidized component and the alcohol or phenol, the alcohol or phenol is present in at least an equimolar quantity, and preferably in excess, e.g. up to a 10 molar excess.

In its broadest scope, therefore, the present invention relates to alkyd resins containing the starting materials discussed above. To this end, the reaction products of epoxidized fatty acid derivatives or epoxidized fatty alcohols with alcohols or phenols are used in quantities of from about 5 to about 60% by weight, preferably from about 5 to about 25% by weight, based on the weight of the alkyd resin. In order to calculate the exact quantity for each individual resin composition, it is preferred to start out from known alkyd resin formulations and to replace the hydroxyl group-containing compounds present therein at least partly by the reaction products of the invention. In many instances, it is desirable to keep the number of moles of hydroxyl groups constant. However, it can also be advantageous to introduce more hydroxyl groups by using the reaction products of the invention in a molar excess, based on the replaced component.

In one embodiment, the invention relates to alkyd resins which contain reaction products of epoxidized fatty acid esters of primary alcohols. These reaction products can best be described by their method of manufacture, although their manufacture is not the subject of the present invention. Suitable starting materials for producing these reaction products are the epoxides of esters of high iodine number fatty acid fractions and primary alcohols, preferably methanol and ethanol. For example, the epoxidized methyl ester of an oleic acid-rich fatty acid fraction obtained from soybean oil is a suitable starting material. The reaction with monofunctional or polyfunctional hydroxy compounds can be carried out as described above. Although suitable alkyd resin raw materials are also formed in the reaction with monofunctional hydroxy compounds, nevertheless the reaction with polyfunctional hydroxy compounds, especially with those mentioned above, is preferred. Although under gentle conditions it is possible to open the epoxide ring without reaction taking place on the ester group, it is nevertheless preferred that ester exchange be performed simultaneously. In this process the hydroxy compounds are likewise used in molar quantities or in excess. Molar ratios (ester:hydroxy compound) frequently used are 1:1, 1:2, 1:3, 1:4, and 1:10. Particularly suitable alkyd resin raw materials are produced by reaction of epoxidized fatty acid esters with dihydroxy compounds or trihydroxy compounds under ring opening and ester exchange.

In another embodiment, the invention relates to alkyd resins containing reaction products of epoxidized triglycerides with hydroxy compounds. Reaction products such as these may also best be characterized by their method of production. However, the present invention is not directed to the production of the reaction products. Epoxidized triglycerides can be produced from oils containing double bonds. Suitable oils include vegetable oils such as sunflower oil, soy oil, wood oil, linseed oil and others. The epoxidization of these oils can be carried out in such a way that from only a few double bonds to virtually all the double bonds are converted into epoxide rings. The ring opening of the epoxides with the hydroxy compounds is carried out in the presence of catalysts and in such a way that hardly any epoxide groups can be detected in the reaction product. Although partly ring-opened epoxidized triglycerides are commercially obtainable, they are not the reaction products of the present invention.

The reaction products of epoxidized triglycerides can be classified according to the functionality of the hydroxy compound used. Reaction products with primary alcohols contain only secondary —OH groups. Monofunctional hydroxy compounds suitable for ring opening are alkanols such as methanol, ethanol, propanol and their higher homologs, especially fatty alcohol cuts, alcohols having a branched carbon chain or cyclic alcohols, and also phenols. Methanol, ethanol and phenol are preferred for alkyd resins used in stoving lacquer systems. Unsaturated alcohols, such as allyl alcohol for example, and also fatty alcohol mixtures having an iodine number of from 60 to 170 are preferred for air-drying alkyd resins.

The reaction products of the epoxidized triglycerides with dihydroxy compounds differ in their chemical structure according to the molar ratio between the reactants used. If the dihydroxy compounds are used in a quantity of one or more moles per mole of epoxide groups, resin-like compounds containing more secondary than primary hydroxyl groups are formed. If the dihydroxy compounds are used in a large excess, for example, 4 moles per mole of epoxide group to 10 moles per mole of epoxide group, compounds are formed which can contain up to an equal number of primary and secondary —OH groups. Both types of reaction products and also mixtures thereof and transition types between the two are suitable alkyd resin starting materials in the context of the invention. Suitable dihydroxy compounds for the ring opening of the epoxidized triglycerides are, for example, glycols, such as ethylene glycol or propylene glycol, condensation products thereof, propane diol, butane diol, neopentyl glycol, hexane diol, bisphenol A, and other dihydroxy compounds of the type normally used in alkyd resins.

Reaction products of epoxidized triglycerides suitable for use in accordance with the invention can also be produced by ring opening with trihydroxy compounds or even higher hydroxy compounds. Suitable trihydroxy or higher hydroxy compounds are primarily glycerol, trimethylol ethane, trimethylol propane, pentaerythritol, sorbitol and also the polyols obtainable by the autocondensation of glycerol with elimination of water. Reaction products of these monofunctional or higher hydroxy compounds with a $C_2$–$C_4$ alkene oxide such as ethylene oxide and/or propylene oxide can also be used herein. Preferred starting materials for alkyd resins to be processed into water lacquers are the reaction products of epoxidized soy oil with a large excess of ethylene glycol or glycerol.

In one preferred embodiment, the invention relates to alkyd resins containing reaction products of epoxidized fatty alcohols. Fatty alcohols are mixtures of primary, unbranched monofunctional alcohols which, in their chemical composition, i.e. in the number and position of double bonds, correspond to the fatty acid cuts from which they can be produced with the double bonds intact. Fatty alcohols can be epoxidized and further processed with hydroxy compounds to form the reaction products according to the invention using the method described above.

Reaction products of epoxidized fatty alcohols are best described by their starting materials. Thus, diols which have been produced by the ring opening of epoxidized fatty alcohols having a high epoxide number with monofunctional alcohols are suitable for the purposes of the invention. Preferred monofunctional alcohols are methanol and ethanol. However, it is also possible to use their higher homologs, particularly saturated fatty alcohols which are already present in admixture with the epoxidized fatty alcohols. Unsaturated alcohols or phenols can also be used. Alcohols containing one or more double bonds are preferred for air-drying systems.

According to the invention, preferred reaction products of epoxidized fatty alcohols are those with polyfunctional hydroxy compounds, including both reaction products in a molar ratio of approximately 1:1 and also reaction products having a large excess, for example a 4 to 10 molar excess, of polyfunctional hydroxy compound. Polyfunctional hydroxy compounds suitable for reaction with epoxidized fatty alcohols are given above in the discussion of the reaction products of epoxidized triglycerides.

Particularly preferred reaction products according to the invention are obtained by epoxidizing fatty alcohol mixtures rich in oleyl alcohol, preferably having an iodine number of from 50 to 170, followed by reaction with triols or diols. The reaction products with ethylene glycol, glycerol and trimethylol propane are particularly preferred.

In another particularly preferred embodiment, epoxidized fatty alcohols rich in epoxidized erucic alcohol are reacted with the above-mentioned diols and triols.

In another embodiment of the invention, the alkyd resins produced contain reaction products of epoxidized fatty alcohols which had been reached with from 3 to 30 moles of ethylene oxide or propylene oxide. It is particularly preferred to react them with from 3 to 5 moles of propylene oxide. Reaction products with from 3 to 10 moles of ethylene oxide are preferred for more hydrophilic resins, for example for use in water lacquers.

In another embodiment of the invention, reaction products of epoxidized fatty acid amides are used. Fatty acids useful herein are primary, straight chain, unsaturated, monofunctional carboxylic acids. The amides thereof useful herein are amides with ammonia or a primary, secondary or tertiary alkyl amine or an alkanolamine, wherein such amines contain up to 5 carbon atoms. In this embodiment, ring opening products of diethanolamides of unsaturated fatty acids with primary alcohols, dihydroxy, trihydroxy or even higher hydroxy compounds are particularly preferred.

A variety of different alkyd resins can be synthesized using the reaction products of epoxidized fatty acid derivatives or epoxidized fatty alcohols according to the invention. Thus, it is possible to produce resins having a high or low fatty acid content (long-oil or short-oil resins) and also alkyd resins free from fatty acids. It is also possible to produce alkyd resins of low molecular weight (approximately 2000) and high molecular weight (approximately 10,000). In addition, alkyd resins containing numerous carboxyl groups for use in water lacquers and also alkyd resins having a low (<10) or very low (<2) acid number can also be produced.

Alkyd resins having a fatty acid content of greater than 40% by weight and a very low acid number generally give sufficiently flexible and sufficiently water resistant coatings so that, with respect to such resins, the main advantage provided by the present invention lies in the use of a predominantly natural starting material.

By contrast, the alkyd resins according to the invention having a fatty acid content of less than 40% by weight are distinguished by increased flexibility. Alkyd resins according to the invention having an acid number of <10 or even <25 are improved with respect to flexibility and, more particularly, with respect to resistance to condensed moisture.

Thus, the invention also covers alkyd resins which contain up to approximately 40% by weight of fatty acids and which have been condensed to an acid number of <10 and to an —OH number of <100 mg of KOH/g. Such resins are preferably high molecular weight resins which can be processed in solvents by virtue of their comparatively small number of hydrophilic groups. Where fatty acids having a high iodine number (for example an iodine number of <90) are used for synthesizing the resins, the resins can be hardened by drying in air. On the other hand, however, hardening by crosslinking with reactive resins, for example melamine resins or resins containing isocyanate groups, can also be carried out where the —OH number is more than about 50 mg of KOH/g.

Resins such as these according to the invention are preferably obtained by reacting the reaction products of epoxidized fatty and esters, fatty acid amides or fatty alcohols with other hydroxy compounds, such as glycerol, trimethylol propane, neopentyl glycol, ethylene glycol, pentaerythritol or sorbitol, with fatty acids and polybasic carboxylic acids or their reactive derivatives.

The polybasic carboxylic acids or reactive derivatives thereof used as a component of the reaction mixture include aliphatic dicarboxylic acids, such as adipic acid, sebacic acid, glutaric acid, succinic acid, maleic acid, or fumaric acid; aromatic dicarboxylic acids, such as phthalic acid and/or isomers thereof; and tricarboxylic acids, such as trimellitic acid. Reactive derivatives thereof that can be used instead of the free acids include anhydrides and esters thereof. Such esters are preferably esters of lower alcohols, e.g. methanol or ethanol.

The monofunctional modifying agents that can optionally be employed to prepare the alkyd resins of the invention can be employed in amounts sufficient to produce alkyd resins that contain up to about 40%, e.g. from about 5 to about 40% by weight thereof, based on the total weight of the alkyd resin. Natural or synthetic fatty acids can be employed as monofunctional modifying agents. However, it is also known that fatty alcohols or olefin oxides containing more than 8 carbon atoms, preferably from 8 to 22 carbon atoms, can be used as modifying agents. A detailed discussion of alkyd resins for lacquers and modifying agents that can be used therewith, which can also be used herein, may be found in the book entitled "Waterborne Coatings" by Charles R. Martens, Van Nostrand Reinhold Co., New York, 1981.

The reaction to produce the alkyd resins of the invention is carried out by heating the reactants together at temperatures in the range of from 150° to 250° C. Acid catalysts, such as p-toluene sulfonic acids for example, can be added. The course of the reaction can be followed from the amount of water of reaction separated off and also by measuring the acid number.

Other alkyd resins according to the invention are resins containing up to 40% by weight of fatty acids which have been condensed to an acid number of from 25 to 80 and which have an —OH number of <100 mg of KOH/g. These resins are suitable for use in water lacquers. By virtue of their high functionality, the resins generally have a relatively low molecular weight, normally in the range from 2000 to 10,000. To produce the water lacquers from the resins, the resins are neutralized with bases and dissolved in water, generally in the presence of standard additives.

Alkyd resins according to the invention for use in air-drying water lacquers have a high content of unsaturated compounds, but contain very few hydroxyl groups. By contrast, alkyd resins according to the invention for use in stoving water lacquers have an —OH number of <50 mg of KOH/g so that they may be hardened by reaction—on stoving—with melamine resins, for example. Using the reaction products of epoxidized fatty acid esters, fatty acid amides or fatty alcohols, it is possible to obtain resins for water lacquers which can be processed to form coatings which are particularly resistant to condensed moisture and which can be made both hard and flexible.

One particularly preferred type of alkyd resin according to the invention has an acid number of from about 5 to about 40, preferably from about 15 to about 30 and, more preferably, from about 20 to about 25 and an —OH number of <100, preferably <200. To produce resins of this type, a resin prepared in accordance with the teachings of German Pat. No. 2,842,919 is modified by the molar replacement of a dihydroxy or trihydroxy compound with the reaction products according to the invention. To this end, from about 5 to about 60% by weight, preferably from about 5 to about 25% by weight, based on total resin, of said reaction products are employed, together with fatty acids, dicarboxylic acids such as adipic acid or phthalic acid, tricarboxylic acids such as trimellitic acid, and optionally other hydroxy compounds under dehydrating conditions until a resin having an acid number of from 30 to 180 and preferably from 60 to 100 is formed. The resin thus formed is then esterified by the addition of glycidol until it has an acid number of from about 5 to about 35 mg of KOH/g. The alkyd resins thus produced can be made up in the presence of neutralizing agents and emulsifiers, which lose at least some of their hydrophilicity on stoving, into solvent-free, optically clear aqueous alkyd resin preparations (microemulsions).

Resins such as these can be made up into water lacquers which, even with pigments, give high-gloss films after stoving (75 to 98% reflection at an angle of 20°). When the ring opening products of epoxidized fatty acid derivatives or fatty alcohols were replaced by "oxoalcohols" (formulation products of oleyl alcohol for example), such as for example 9-(hydroxymethyl)-octadecanol or 9,10-di-(hydroxymethyl)-octadecanol, in the resins according to the invention, a reflection value of only 40 to 50% at an angle of 20° was measured in white lacquers.

In another embodiment, the invention relates to so-called oil-free alkyd resins. Oil-free alkyd resins are understood to be alkyd resins which do not contain any fatty acids, but instead contain the reaction products of long-chain epoxides. Alkyd resins such as these can be obtained by the condensation of monofunctional olefin oxides having a terminal or internal epoxide ring and containing from 8 to 22 carbon atoms with dicarboxylic and tricarboxylic acids, polyols and, optionally, other hydroxyl compounds. They can be produced with any acid numbers, for example, with acid numbers of from 1 to 5, 10 to 15, 15 to 20, 20 to 25 or 25 to 80.

Where the oil-free alkyd resins according to the invention have acid numbers below 10, more particularly below 5, and an OH number below 100, it is preferred to make them up into solvent lacquers in a known manner. Suitable solvents are the solvents or solvent mixtures normally used in alkyd resin lacquers.

If the alkyd resins according to the invention have an acid number of >25 and <80 and an OH number of <100, they can be made up into conventional water lacquers. Resins such as these are dissolved in water using auxiliary solvents, such as butyl glycol, after neutralization with volatile amines such as, for example, ammonia, triethylamine or dimethyl ethanolamine.

Alkyd resins according to the invention having an OH number of >100 and an acid number of from about 5 to about 40 are colloidally soluble in water in the absence of organic solvents or are readily emulsifiable in the presence of small quantities of emulsifier, i.e. from about 1 to about 5% by weight, based on alkyd resins, after partial or complete neutralization of the carboxyl groups still present with organic bases. Adducts of glycidol, if desired in admixture with ethylene oxide, with alcohols or ester alcohols or alkyl phenols or fatty acids, fatty amines or fatty acid amides containing from 12 to 26 carbon atoms in the hydrophobic part of the molecule (although the molecule as a whole should contain from 2 to 22 hydroxyl groups) are advantageously used for emulsification or merely for improving stability in storage.

Amines which are nonvolatile under stoving conditions are particularly suitable for neutralizing all the alkyd resins according to the invention having an acid number of from about 5 to about 40. Amines such as these are, for example, tertiary amines containing 2,3-dihydroxy propyl groups on the nitrogen atom of the type described in U.S. Pat. No. 4,259,219. Amino alcohols containing an internal, primary amino group, of the type known from British patent application No. 1,003,326, are also suitable.

The solutions of the alkyd resins according to the invention can be pigmented by conventional methods. As lacquer binders, combinations of the alkyd resins according to the invention with amino resin formers, such as hexamethyl ethers of hexamethylol amine, and the corresponding condensates have particularly favorable properties.

If the resins in question are stoving resins, the lacquer films obtained by applying the solutions in a known manner are stoved, for example after preliminary drying, at temperatures of from about 120° to 180° C. in suitable drying ovens or drying tunnels.

The lacquers can be used for coating a variety of materials, such as glass or metals, for example aluminum, iron, steel and the like. The correspondingly stoved coatings are distinguished by high flexibility, even though hard, by good adhesion to metals (even in pigmented form), by high gloss, and by increased resistance to condensed moisture. Water lacquers based on alkyd resins according to the invention having an OH number of >200 and an acid number of from about 5 to about 40 mg of KOH/g in particular have proved to be distinctly superior both to conventional emulsions and also to water-dilutable amine-neutralized systems having high acid numbers. The present water lacquers reach and, in some instances, exceed the quality standard of alkyd resins of the type used or applied from solvents. In this connection, particular reference is made to the advantages afforded by the complete absence of organic solvents and the minimal presence of volatile amines.

The invention will be illustrated by the following examples which are given for that purpose only and not for purposes of limitation.

EXAMPLES

1. Production of Alkyd Resins

The condensation reaction was carried out in the usual way under nitrogen in a heatable esterification apparatus. The components for the first stage were heated together in the presence of 4.00 kg of xylene until the required acid number was reached.

EXAMPLE 1

The following components were condensed:
6.16 kg of fractionated fatty acids (chain length distribution:
  60% by weight of caprylic acid
  35% by weight of capric acid
  3% by weight of lauric acid
  2% by weight of higher fatty acids)
2.28 kg of glycerol
6.16 kg of the reaction product of an epoxidized soy oil with ethylene glycol Ratio: 2 moles of ethylene glycol per mole of epoxide groups. Excess diol removed by distillation. OH number 354
11.08 kg of neopentyl glycol
9.88 kg of phthalic acid anhydride
7.68 kg of trimellitic acid anhydride
  Reaction time: 4 hours
  Reaction temperature: max. 190° C.
  Acid number: 71.8 (product 1)

2.25 kg of water were separated and the xylene removed by distillation in vacuo.

The following components were reacted in a second reaction step:
40.99 kg of alkyd resin (product 1, acid number 71.8)
2.64 kg of glycidol
1.20 kg of a 50% aqueous glycerylamine solution (adduct of 1 mole of 2-amino-2-methyl propanol and 2 moles of glycidol)
  Reaction time: 90 minutes
  Reaction temperature: max. 140° C.
  Final acid number: 25

The alkyd resin product prepared above was mixed while heating with 4.90 kg of a 50% aqueous solution of the adduct of 7.5 moles of glycidol with 1 mole of nonyl phenol as an auxiliary emulsifier and 9.20 kg of a 50% aqueous solution of the adduct of 2 moles of glycidol with 1 mole of 1-amino-2-methyl propanol. 2.06 kg of water were then added so that an alkyd resin microemulsion having a solids content of 85% was formed.

EXAMPLE 2

The procedure of EXAMPLE 1 was repeated, except that the following polyol was used instead of the reaction product of epoxidized soy oil with ethylene glycol:
6.16 kg of the reaction product of the epoxide of a $C_{18}$-fatty alcohol having an iodine number of from 92 to 96 with ethylene glycol in a molar ratio of 1:1; OH number 346
Final acid number 26.0

EXAMPLE 3

The same procedure used in Examples 1 and 2 was followed, except that the following polyol was employed:
6.16 kg ester exchange and ring opening product of an epoxystearic acid methyl ester (prepared from methyl oleate, iodine No. 55, by complete epoxidation) with ethylene glycol in 1:2 molar ratio; excesses were distilled off.
Final acid number: 24.5

EXAMPLE 4

The same procedure used in Examples 1 to 3 was followed, except that the following polyol was employed:
6.16 kg ester exchange and ring opening product of an epoxystearic acid methyl ester (prepared from methyl oleate, iodine No. 80, by complete epoxidation) with trimethylol propane in a 1:2 molar ratio. Excesses were distilled off (thin layer evaporator).
Final acid number: 25.5.

COMPARISON EXAMPLE

The following condensate, which is a suitable base for water-dilutable alkyd resins, was prepared for comparison purposes:

The procedure described in EXAMPLE 1 was repeated except that the reaction product of epoxidized soy oil with ethylene glycol was replaced by 2.11 kg of trimethylol propane. Final acid number: 25.0

2. Production of a White Lacquer

A ground paste was prepared in a dissolver from (parts by weight):
50 parts of alkyd resin, 85% in water,
32 parts of deionized water,
30 parts of pigmenting aids (9 parts of a 30%, acid-group-containing low molecular weight acrylate dispersion—PRIMAL I94, a product of the Rohm & Haas Co.—and 1 part of 2-methyl-2-amino-propanol-2-glycidol, 75% by weight in water),
183 parts of titanium dioxide (CHRONOS TITAN CL 310).

A lacquer was made up with
309 parts of alkyd resin, 85% in water,
131 parts of melamine resin (CYMEL 301, a product of American Cyanamid Co.),
265 parts of deionized water,
1000 parts of a white lacquer having an alkyd resin to melamine resin ratio of 7:3 and a pigment volume concentration of approximately 11% were obtained.

3. Testing of the Coatings

To test the films, the lacquers were sprayed onto steel plates and stoved for 15 minutes at 160° C. The dry films were between 25 and 40 μm thick. The results obtained for these coatings are given in the tables below.

TABLE 1

| Example No. | Konig pendulum hardness (secs) | Indentation mm | % Gloss 20° | Gloss at 20° after 600 hours in a Weather-O-Meter |
|---|---|---|---|---|
| 1 | 153 | 6.8 | 98 | 70 |
| 2 | 161 | 5.8 | 85 | 62 |
| 3 | 124 | 6.6 | 78 | 55 |
| 4 | 148 | 6.9 | 77 | 60 |
| Comparison | 196 | 2.7 | 85 | 52 |

TABLE 2

Results of the "sweatbox" test at 40° C.
Bubble assessment according to DIN 53209

| No./hours | 24 | 48 | 120 | 168 | 216 | 288 |
|---|---|---|---|---|---|---|
| 1 | 0 | 0 | 0 | 0 | m1/g1 | m4/g1 |
| 2 | 0 | 0 | 0 | 0 | 0 | m1/g1 |
| 3 | 0 | 0 | 0 | 0 | 0 | m1/g1 |
| 4 | 0 | 0 | 0 | 0 | m1/g1 | m1/g1 |
| Comparison | 0 | m2/g1 | m4/g2 | m5/g3 | m5/g3 | — |

What is claimed is:

1. An alkyd resin comprising at least one reaction product of
   (A) a polybasic carboxylic acid or reactive derivative thereof;
   (B) a polyhydric alcohol wherein at least a portion thereof is a reaction product of
      (a) a compound selected from the group consisting of an epoxidized fatty acid ester, an epoxidized fatty acid amide, and an epoxidized fatty alcohol; and
      (b) a hydroxy-containing compound selected from the group consisting of an alcohol and a phenol, wherein the hydroxy-containing compound can be the reaction product of an alcohol or a phenol with a $C_2$-$C_4$ alkene oxide; and, optionally,
   (C) a monofunctional modifying agent.

2. An alkyd resin in accordance with claim 1 wherein the reaction product of (B)(a) and (B)(b) is present in the alkyd resin in from about 5 to about 60% by weight, based on the weight of the alkyd resin.

3. An alkyd resin in accordance with claim 2 wherein from about 5 to about 25% by weight of said reaction product is present.

4. An alkyd resin in accordance with claim 1 wherein the compound in (B)(a) is either an epoxidized triglyceride, an epoxidized ester of an unsaturated fatty acid and an alcohol having up to 8 carbon atoms, epoxidized oleyl alcohol having an iodine number of from 50 to 170, or epoxidized erucic alcohol.

5. An alkyd resin in accordance with claim 1 wherein the hydroxy-containing compound in (B)(b) is at least one of the following:
   (i) a primary monofunctional straight-chain or branched aliphatic alcohol containing up to 8 carbon atoms;
   (ii) a glycol containing up to 6 carbon atoms;
   (iii) a polyhydric alcohol selected from the group consisting of glycerol, trimethylol propane, and pentaerythritol;
   (iv) a polyhydric phenol selected from the group consisting of hydroquinone, resorcinol, and bisphenol A; and
   (v) a reaction product of any of (i) through (iv) with ethylene oxide, propylene oxide, or glycidol.

6. An alkyd resin in accordance with claim 1 wherein the hydroxy-containing compound of (B)(b) is a reaction product with from 1 to 30 moles of ethylene oxide, propylene oxide, or glycidol per mole of alcohol or phenol.

7. An alkyd resin in accordance with claim 1 wherein a monofunctional modifying agent (C) is present and is a fatty acid which is present in up to about 40% by weight, based on the weight of the alkyd resin.

8. An alkyd resin in accordance with claim 1 wherein a monofunctional modifying agent (C) is present and is a $C_8$-$C_{22}$ alkene oxide.

9. An alkyd resin in accordance with claim 1 wherein the alkyd resin has an acid number of from about 5 to about 40 and an —OH number above 100 mg of KOH/g of resin.

10. An alkyd resin in accordance with claim 1 wherein the acid number is less than 10.

11. An alkyd resin in accordance with claim 9 wherein the acid number is from about 15 to about 30.

12. An alkyd resin in accordance with claim 9 wherein the acid number is from about 20 to about 25 and the —OH number is above 200 mg of KOH/g of resin.

13. An alkyd resin in accordance with claim 1 wherein the alkyd resin has an acid number of from about 5 to about 35 and an —OH number above 200 mg of KOH/g of resin.

14. An alkyd resin in accordance with claim 1 wherein the alkyd resin has an acid number of from about 25 to about 80 and an —OH number below 100 mg of KOH/g.

15. An alkyd resin in accordance with claim 1 wherein the alkyd resin has been reacted with glycidol to an acid number of from about 5 to about 35 mg of KOH/g of resin.

16. A stoving lacquer composition which comprises the alkyd resin of claim 1 and stoving lacquer excipients.

17. A stoving lacquer composition in accordance with claim 15 wherein the stoving lacquer is a stoving water lacquer.

* * * * *